(12) United States Patent
Sugino

(10) Patent No.: US 10,236,097 B2
(45) Date of Patent: Mar. 19, 2019

(54) WIRE HARNESS

(71) Applicant: Sumitomo Wiring Systems, Ltd., Yokkaichi, Mie (JP)

(72) Inventor: Hidetoshi Sugino, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/827,907

(22) Filed: Nov. 30, 2017

(65) Prior Publication Data

US 2018/0174705 A1 Jun. 21, 2018

(30) Foreign Application Priority Data

Dec. 21, 2016 (JP) ................................ 2016-247705

(51) Int. Cl.
| | |
|---|---|
| *H01R 9/05* | (2006.01) |
| *H01B 7/00* | (2006.01) |
| *H02G 3/04* | (2006.01) |
| *B60R 16/02* | (2006.01) |
| *H01R 4/02* | (2006.01) |

(52) U.S. Cl.
CPC ....... *H01B 7/0045* (2013.01); *B60R 16/0207* (2013.01); *H02G 3/0406* (2013.01); *H01R 4/02* (2013.01)

(58) Field of Classification Search
CPC .. H01B 7/04; H01B 7/0045; H01B 13/01209; H02G 3/0406; H01R 4/02

USPC ....................................... 174/74 A, 74 R, 78
See application file for complete search history.

(56) References Cited

U.S. PATENT DOCUMENTS

| | | | |
|---|---|---|---|
| 4,781,227 A * | 11/1988 | Cross ............... | H01B 13/01209 140/92.1 |
| 2010/0230157 A1* | 9/2010 | Sakata ................ | B60R 16/0215 174/72 A |
| 2015/0266435 A1* | 9/2015 | Wakabayashi ...... | B60R 16/0215 174/72 A |
| 2015/0279514 A1* | 10/2015 | Sato .................... | B60R 16/0207 174/72 A |
| 2015/0329069 A1* | 11/2015 | Daugherty .......... | B60R 16/0207 174/72 A |

FOREIGN PATENT DOCUMENTS

JP        2015171304 A        9/2015

* cited by examiner

*Primary Examiner* — William H. Mayo, III
(74) *Attorney, Agent, or Firm* — Reising Ethington, P.C.

(57) ABSTRACT

A wire harness including a conductive portion that can be electrically connected to a device that is located midway along the routing path. A wire harness includes a conductive portion extending along a routing path to form a circuit. The conductive portion is formed of a single-core wire or a pipe. A branch connection portion configured to be flat against a portion of the conductive portion that is adjacent thereto is provided in the conductive portion midway in an extension direction thereof. A branching wire is connected to the branch connection portion.

5 Claims, 3 Drawing Sheets

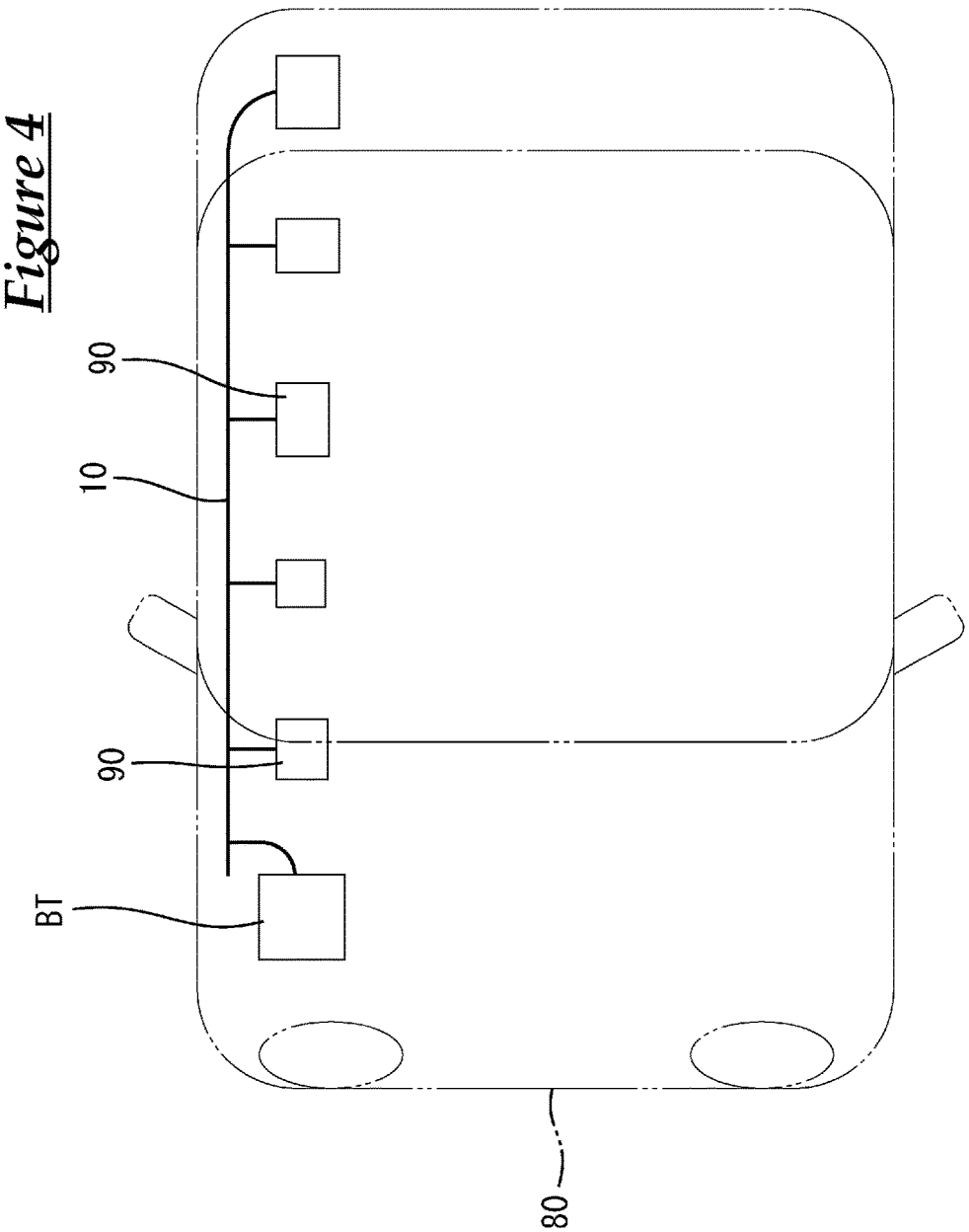

WIRE HARNESS

CROSS REFERENCE TO RELATED APPLICATIONS

This application claims the priority of Japanese patent application JP2016-247705 filed on Dec. 21, 2016, the entire contents of which are incorporated herein.

TECHNICAL FIELD

The present invention relates to a wire harness.

BACKGROUND ART

The wire harness described in JP 2015-171304A includes a plurality of wires, a shielding/grounding member, and a main ground cable. The plurality of wires include ground wires that electrically connect a device to which the wires are connected and a grounding reference potential body (e.g., the negative terminal of a battery). The shielding/grounding member includes a connection target portion to which a ground terminal connected to the ground wire is connected. The shielding/grounding member also includes a grounding portion, and the grounding portion is connected to the reference potential body via the main ground cable.

The ground wire is electrically connected to the reference potential body via the shielding/grounding member. Accordingly, only a relatively short ground wire is required even when the device and the reference potential body are disposed away from each other.

JP 2015-171304A is an example of related art.

SUMMARY

With the above-described wire harness, for example, when the body of a vehicle includes a carbon body, and a reference potential body, such as a metal frame, suitable for grounding is not present near the device, the application of the above-described technique can shorten the length of the ground wire, making it possible to reduce the number of clamps for supporting the ground wire that may droop midway in the routing path, or omit the use thereof.

However, the shielding/grounding member has a complex structure. Accordingly, for example, when a plurality of devices are disposed in a branched manner midway along the routing path, a connection target portion needs to be newly provided for each device, making the process for molding a shielding/grounding member complicated.

The present design has been completed in light of the above-described circumstances, and it is an object of the design to provide a wire harness that has a relatively simple structure, is highly versatile, and includes a conductive portion that can be electrically connected to a device that is branched midway in the routing path.

An aspect of the present design is directed to a wire harness including a conductive portion extending along a routing path to form a circuit, wherein the conductive portion is formed of a single-core wire or a pipe, and a branch connection portion is provided in the conductive portion midway in an extension direction thereof.

Since the conductive portion is formed of a single-core wire or a pipe, it is possible to simplify the structure. Unlike a commonly used wire, there will be substantially no possibility of a single-core wire or a pipe drooping midway in the routing path, thus making it possible to reduce the number of clamps for support, or omit the use thereof.

Furthermore, a single-core wire or a pipe is bendable, and thus it is easy to form a predetermined routing path using bending. Moreover, the branch connection portion is provided midway in the conductive portion in the extension direction thereof, thus making it possible to electrically connect a device and the conductive portion via the branch connection portion.

BRIEF DESCRIPTION OF THE DRAWINGS

FIG. 4 is a conceptual diagram of a wire harness that is routed in a vehicle.

EMBODIMENTS

Figure 1:
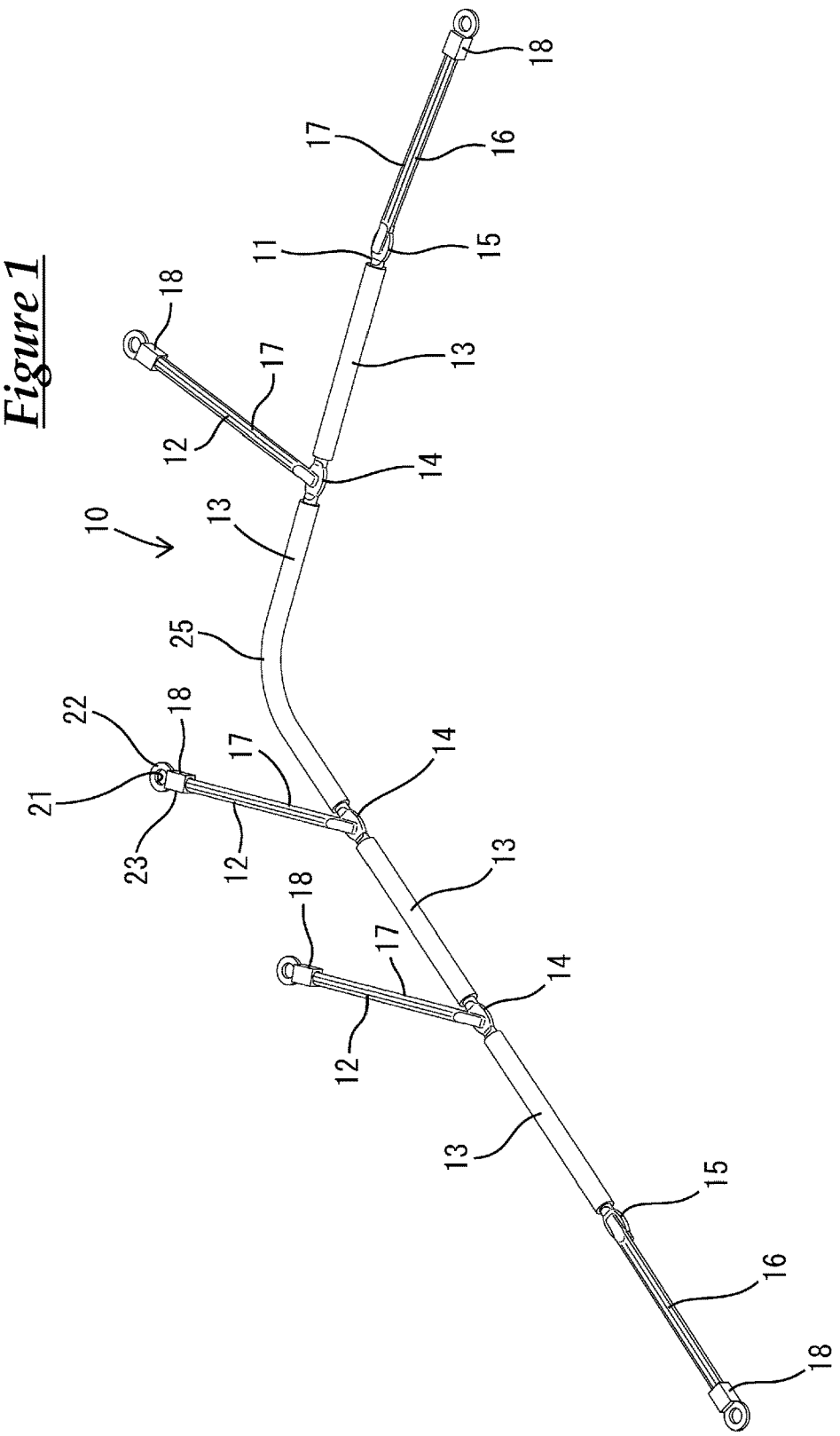
FIG. 1 is a perspective view of a wire harness according to Embodiment 1 of the present design.

Preferred embodiments of the present design will be described below.

The branch connection portion may be configured to be flat against a portion of the conductive portion that is adjacent thereto. With this configuration, the flat portion of the branch connection portion can be used as the branch connection region, making it possible to easily perform branch connection.

A portion of the conductive portion excluding the branch connection portion may be covered by an insulating tube, and the branch connection portion may be exposed. With this configuration, the portion of the conductive portion excluding the branch connection portion is protected by the insulating tube. Additionally, the branching position of the branch connection portion can be defined by the exposed portion of the conductive portion.

A branching wire may be connected to the branch connection portion. With this configuration, the branch connection portion and the device can be easily connected using the wire.

Embodiment 1

Hereinafter, Embodiment 1 will be described with reference to the drawings. As conceptually shown in FIG. 4, a wire harness 10 according to Embodiment 1 forms a ground circuit of an electric device 90 that is mounted to a vehicle 80, and includes a conductive portion 11 constituting a main line, and a plurality of branched portions 12 constituting branch lines.

The conductive portion 11 is formed of a solid (filled) and rod-shaped, single-core wire extending in an elongated manner along a routing path. The single-core wire is a member composed mainly of a metal such as copper or aluminum, and can be deformed so as to be bent at a predetermined position, from the state of being molded in a linear rod, in conformity with the routing configuration.

An insulating tube 13 is mounted so as to cover the outer circumference of the conductive portion 11. A heat-shrinkable tube or a resin tube can be used as the insulating tube 13, for example. Here, the insulating tube 13 is attached to the conductive portion 11 at a plurality of locations with intervals in the extension direction, which coincides with the length direction and the routing direction, of the conductive portion 11. Specifically, the insulating tube 13 is attached to the conductive portion 11 at positions excluding end connection portions 15 and branch connection portions 14, which will be described later.

Figure 2:
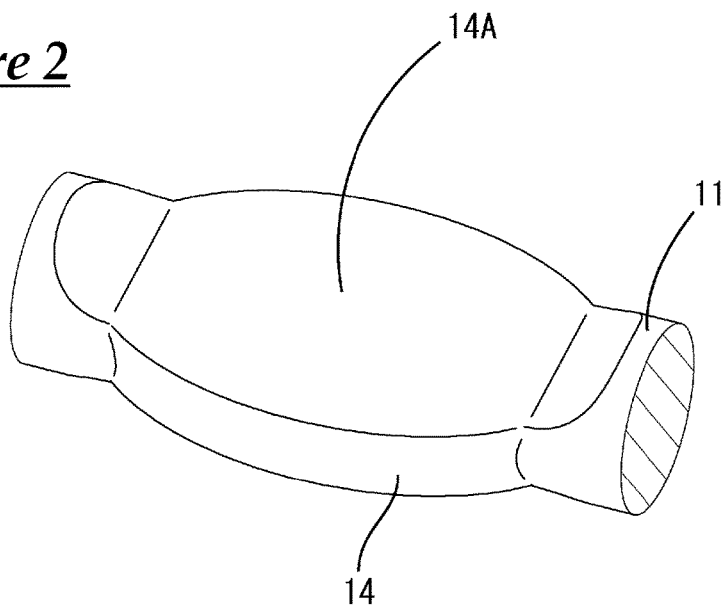
FIG. 2 is an enlarged perspective view of a branch connection portion.

A branch connection portion 14 is provided at a plurality of locations of the conductive portion 11 midway in the extension direction thereof. The branch connection portions 14 are disposed at positions corresponding to branching locations branching to the branched portions 12, and each include a region (a flat surface 14A described later) connected to the branched portion 12. Specifically, each branch connection portion 14 has been compressed in the radial direction into a flat shape, and thus is configured to be flat against a portion of the conductive portion 11 that is adjacent thereto. More specifically, as shown in FIG. 2, the branch connection portion 14 has a straight shape extending continuously in a substantially constant thickness in the extension direction in side view, and has a substantially ellipsoidal shape or a substantially oblong shape that bulges in a curved shape on opposite sides in the radial direction in plan view. The upper and lower surfaces of the branch connection portion 14 are formed as flat surfaces 14A having substantially no irregularities, and the upper flat surface 14A in the drawings serves as a region connected to the branched portion 12. As a result of the bulged portions of the branch connection portion 14 abutting against the end portions of the insulating tubes 13, positional displacement of the insulating tubes 13 in the extension direction is restricted. Note that the end connection portions 15 having substantially the same configuration as that of the branch connection portion 14 are provided at opposite end portions of the conductive portion 11 in the extension direction. Main line end portions 16, which will be described later, having substantially the same configuration as the branched portions 12 are connected to the end connection portions 15.

Each branched portion 12 is composed of a wire 17 extending in a direction intersecting the extension direction of the conductive portion 11, and a terminal 18 that is connected to an end portion of the wire 17 in the extension direction.

Figure 3:
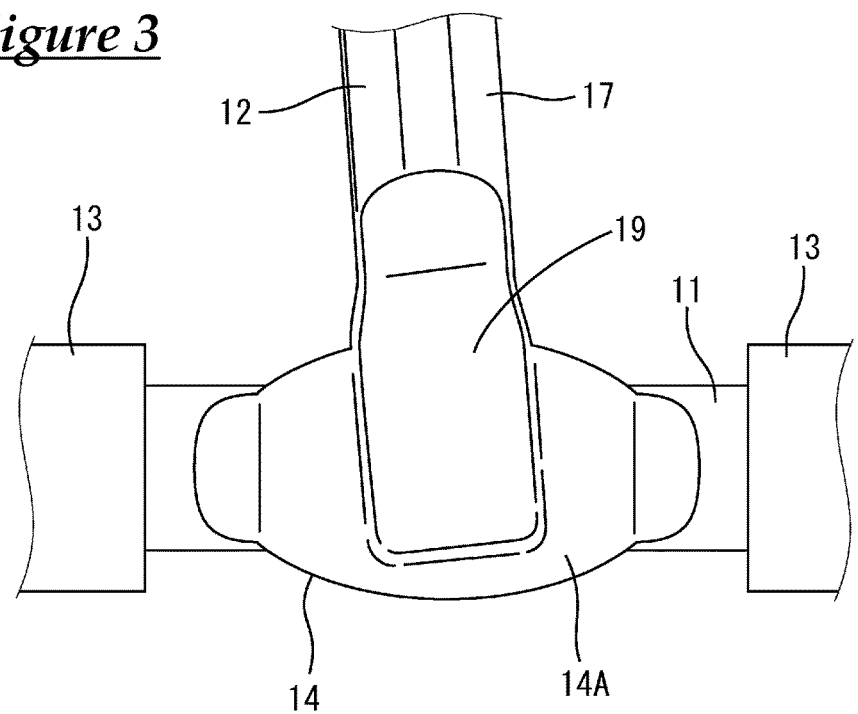
FIG. 3 is a plan view showing a state in which a branching wire is connected to the branch connection portion.

The wire 17 is formed as a block obtained by bonding a plurality of element wires composed mainly of a metal such as copper or aluminum along the extension direction. As shown in FIG. 3, an end portion of the wire 17 that is located on the proximal end side (an end portion opposite to an end on the side where the terminal 18 is connected) is formed as a thin, flat connection body portion 19 that is supported by the flat surface 14A of the branch connection portion 14, and is connected and fixed thereto through ultrasonic welding, soldering, or the like.

As shown in FIG. 1, each terminal 18 is a round terminal, and composed of an annular distal end portion 22 having a hole portion 21 that is open at the center, and a barrel portion 23 continuous with the distal end portion 22. The barrel portion 23 is crimped and connected to an end portion of the wire 17 in the extension direction. A connecting member, such as a bolt, of a device 90 (not shown) is fitted to the hole portion 21 of the distal end portion 22 so that the device 90 is electrically connected.

The foregoing describes the structure of the wire harness 10 according to Embodiment 1 of the present design. Next, a manufacturing method of the wire harness 10 will be described.

First, the insulating tube 13 is externally fitted onto the conductive portion 11 that has a linear rod shape. At this time, the portions (that are not yet flat in shape) of the conductive portion 11 that correspond to the branch connection portions 14 and the end connection portions 15 are not covered by the insulating tube 13, but are disposed so as to be exposed. Here, the insulating tube 13 may be provided in advance so as to correspond to the covered areas of the conductive portion 11. Alternatively, one insulating tube 13 may cover the conductive portion 11, and thereafter be cut at the portions corresponding to the branch connection portions 14 and the end connection portions 15.

Subsequently, the portions of the conductive portion 11 that correspond to the branch connection portions 14 and the end connection portions 15 are compressed by a pressing machine (not shown) from the upper and lower sides, thus forming the branch connection portions 14 and the end connection portions 15 with the flat surfaces 14A.

Then, the connection body portions 19 of each branched portion 12 and each main line end portion 16 are supported by the flat surfaces 14A of each branch connection portion 14 and each end connection portion 15, respectively, of the conductive portion 11, and connected thereto through ultrasonic welding or the like. In this case, the connection body portions 19 of the branched portion 12 and the main line end portion 16 are placed on the flat surfaces 14A of the branch connection portion 14 and the end connection portion 15, and a connection operation can be performed in that state, thus providing excellent workability. The branched portion 12 and the main line end portion 16 are connected, in a state of surface contact, to the branch connection portion 14 and the end connection portion 15, respectively, thus achieving excellent connection reliability.

Then, appropriate locations of the portions of the conductive portion 11 that are covered by the insulating tube 13 are bent using a bender machine (not shown) either two-dimensionally or three-dimensionally in conformity with the routing path. Consequently, one or more bent portions 25 are formed in the conductive portion 11 (see FIG. 1).

Then, the terminals 18 provided at the distal end portions 22 of each branched portion 12 and each main line end portion 16 are connected to the respective corresponding devices 90 mounted on the vehicle 80 (see the conceptual diagram in FIG. 4). In this case, one main line end portion 16 is grounded to a reference potential body such as the negative terminal or the body of a battery BT, and another main line end portion 16 and the branched portions 12 are collectively grounded to the reference potential via the conductive portion 11 serving as the main line. Note that the conductive portion 11 may be supported by the body of the vehicle 80 via a clamp (not shown) that is mounted to a suitable location. However, the conductive portion 11 is a single-core wire and has shape retainability, and therefore, the number of clamps can be lower as compared with a commonly used soft wire.

As described thus far, according to Embodiment 1 of the present design, the conductive portion 11 serving as the main line is formed of a columnar single-core wire, and it is therefore possible to simplify the structure. In addition, unlike a commonly used wire, there is substantially no possibility of a single-core wire drooping during routing, thus making it possible to reduce the number of clamps for providing support to the body, or omit the use thereof. Furthermore, a single-core wire is bendable, and thus can easily be formed into a shape that conforms with the routing path using bending. Moreover, a plurality of branch connection portions 14 are provided in the conductive portion 11 midway in the extension direction thereof, and it is therefore possible to electrically connect the corresponding devices 90 and the conductive portion 11 via the branch connection portions 14.

Since each of the branch connection portions 14 includes the flat surfaces 14A having a shape that is flat against a portion of the conductive portion 11 that is adjacent thereto, the flat surfaces 14A of the branch connection portion 14 can be used as a branch connection region, making it possible to simplify the routing connection.

The portions of the conductive portion 11 excluding the branch connection portions 14 are covered by the insulating tube 13, and thus are protected from foreign objects. On the other hand, the branch connection portions 14 are exposed without being covered by the insulating tube 13, and therefore, the branching positions of the conductive portion 11 are properly defined.

Furthermore, the branching wire 17 is connected to each of the branch connection portions 14, and therefore, the branch connection portions 14 and the corresponding devices 90 can be easily connected using the wire 17.

Other Embodiments

In the following, other embodiments will be described briefly.

The conductive portion may be formed of a conductive pipe that has the shape of a round tube with a hollow interior and is bendable.

The wire of the branched portion may be a coated wire obtained by covering a stranded wire with a coating. Alternatively, a bus bar may be used in place of the wire.

It is also possible to adopt a configuration in which a hole is opened in the branch connection portion, and direct connection to the device is provided via a connecting member inserted through the hole.

A wire harness according to the present design is applicable to circuits other than a ground circuit.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wire harness
11 Conductive portion
12 Branched portion
13 Insulating tube
14 Branch connection portion
17 Wire
18 Terminal

What is claimed is:

1. A wire harness, comprising:
a conductive portion extending along a routing path to form a circuit, wherein the conductive portion includes a branch connection portion and is formed of a single-core wire or a pipe that is bendable, and wherein the branch connection portion is provided in the conductive portion midway in an extension direction thereof and includes a flat surface that is formed via compression in a radial direction of the conductive portion at the branch connection portion; and
a branching wire that includes a wire separate from the single-core wire or the pipe of the conductive portion and a flat connection body portion that is disposed at a first end of the branching wire, the flat connection body portion of the branching wire being connected to the flat surface of the branch connection portion.

2. The wire harness according to claim 1, wherein the branch connection portion includes two bulged portions that are disposed on axially opposite sides of the flat surface of the branch connection portion and that are formed via the compression in the radial direction of the conductive portion at the branch connection portion.

3. The wire harness according to claim 1, wherein a portion of the conductive portion excluding the branch connection portion is covered by an insulating tube, and the branch connection portion is exposed.

4. The wire harness according to claim 1, wherein the conductive portion is configured to form a ground circuit.

5. The wire harness according to claim 1, wherein the branch connection portion is conductive.

* * * * *